July 21, 1925.
H. RICCI
1,546,676
ADJUSTABLE GANG CUTTER
Filed Feb. 11, 1924
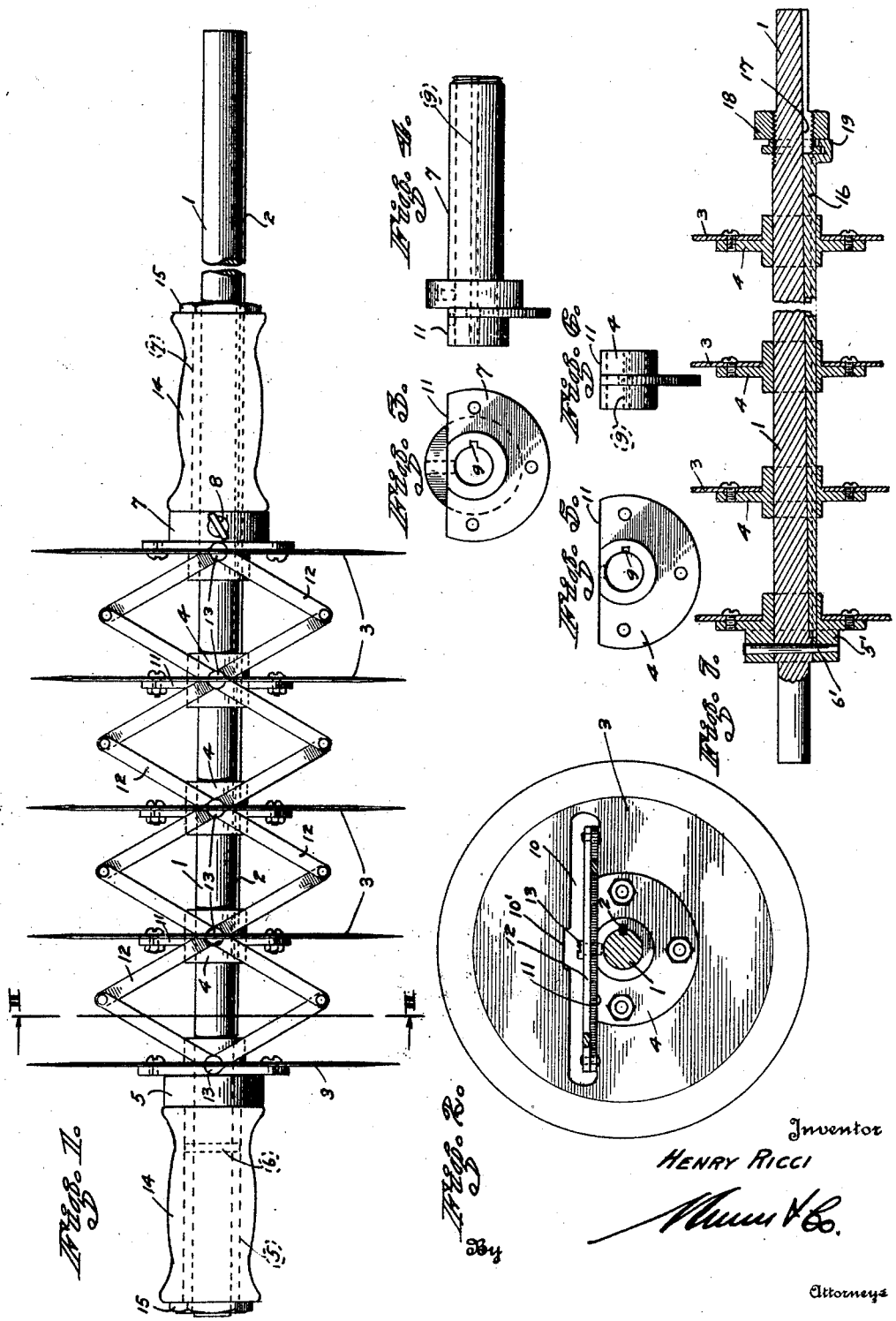
Inventor
HENRY RICCI Patented July 21, 1925.

1,546,676

UNITED STATES PATENT OFFICE.

HENRY RICCI, OF SAN FRANCISCO, CALIFORNIA.

ADJUSTABLE GANG CUTTER.

Application filed February 11, 1924. Serial No. 692,069.

*To all whom it may concern:*

Be it known that I, HENRY RICCI, a citizen of the United States, and a resident of San Francisco, county of San Francisco, and State of California, have invented a new and useful Adjustable Gang Cutter, of which the following is a specification.

This invention relates to gang cutters of the rotary type in which a plurality of knives or saws are used to cut parallel slabs or strips of material of any nature but particularly such as candy, dough, et cetera.

The objects of my invention are to provide apparatus of this kind which is simple and durable in construction and which will permit rapid adjustment of the spaces between the cutters while insuring a uniform spacing of the blades, and all controlled by a single adjusting or locking device regardless as to how many cutting blades are employed.

I attain the objectives enumerated by the construction shown in the drawings hereto and in which:—

Figure 1 is a longitudinal view of a gang of circular cutters mounted on a common shaft and embracing my adjustable features;

Figure 2 is an end view of Figure 1 as seen from the line 2—2 thereof;

Figure 3 is an end view of one of the blade supporting hubs as used for either end blade;

Figure 4 is a side view of Figure 3;

Figures 5 and 6 are respectively end and side views of the hubs which support the intermediate blades;

Figure 7 is a sectional view of a shaft carrying my spaced hubs and blades and shows a tapered key method of locking them in adjusted position.

Briefly stated, my invention consists in providing a plurality of circular cutters or blades with hubs slidably arranged on a shaft and of then connecting all of the hubs together on a "lazy tongs" arrangement passing through openings in the blades to permit the tongs to close up as the blades are closed together or open as the blades are opened.

With reference to Figures 1 to 6 the drawing shows at (1) a splined shaft having a straight spline (2) fixed therein. The circular cutter blades are shown at (3) with the intermediate blades fixed to slidable hubs (4), the left end blade fixed to a long hub (5) pinned at (6) to the shaft and the right end blade fixed to a similar long hub (7) slidable on the shaft and having a thumb screw (8) with which to secure it in place.

The slidable hubs are all keyseated at (9) to freely slide over the spline.

The blades each have a slot formed in them as shown at (10) and the hubs are flattened off on one side at (11) to align with the inner edge of the slot.

Projecting through the disk cutter blades are the lazy tongs (12) with their central pivots (13) extending into the hubs, and preferably consisting of screws so that they may easily be removed if it is desired to change or repair a blade, or for assembling.

The slot (10) is enlarged a trifle over the screw head as shown at (10') so that the screw head can be manipulated and the disks are preferably bolted to the hubs also for purposes of renewal and repairs.

Over each long end hub is a revolvable handle (14) each held from coming off, by a nut (15) screwed on the extreme end of the hub.

The handles are for the purpose of enabling one or two operators to roll the cutters over a sheet of candy or dough to cut it in strips, and then if desired to reduce it to squares by rolling it across the strips.

To adjust the spaces between the cutters it is simply necessary to loosen the screw (8) and slide the right hub (7) back and forth along the shaft to the required position to space the cutter as desired,—the lazy tongs connection insuring even movement.

A slight play of the lazy tongs joints will not materially affect the operation of the device, for the moment the cutters enter the material to be cut they are automatically all stabilized thereby.

In some cases, however, it may be desirable to lock all the hubs, and this can be done easily by a common tapered key (16) fitting in a tapered keyway (17) in the shaft as shown in Figure 7. The taper key has an outer face parallel with the shaft and engages a parallel keyseat in each hub as shown.

To slide the key for release or locking of the hubs I provide a flanged nut (18) threaded to the shaft and engaging a tongue (19) formed on the key so that by turning the nut the key may be forced back and forth along the shaft.

In Figure 7 the lazy tongs are also supposed to be used,—the section taken being the lower half below the tongs so that they do not show, and the end hub (5') is pinned at (6') to the shaft.

The arrangement shown in Figure 7 is especially suitable for a power drive where the shaft is held in bearings and the material to be cut passes under the cutters on a moving table or similar arrangement.

Having thus described my adjustable gang cutter it will be apparent that my improvements are applicable to plain circular blades, circular saws, or other cutters,—or blades which are not circular—and is adapted to any size cutters for use in cutting any desired material, and while I show the lazy tongs on one side only of the hubs it is evident without illustration that two sets of tongs may be arranged at diametrically opposite points on the hubs, and any such modifications coming within the spirit of my invention are intended to be covered in my appended claims.

I claim:

1. A plurality of rotary cutters each provided with a hub, and a plurality of articulated levers pivotally associated with the hubs and linking the hubs in spaced relation.

2. A plurality of rotary cutters each provided with a hub, a shaft slidably supporting the hubs, and a plurality of articulated levers pivotally associated with the hubs and linking the hubs in spaced relation for slidable adjustment along the shaft.

3. A plurality of rotary disk cutters each provided with a hub, openings through the cutters adjacent the hubs, and a pair of lazy tongs passing through the openings and pivotally connected with the hubs at points of articulation of the tongs.

4. A plurality of axially aligned rotary disk cutters each provided with a hub, a shaft slidably supporting the hubs, openings through the cutters adjacent the hubs, and a pair of lazy tongs passing through the openings and pivotally connected to the hubs at points of articulation of the levers.

5. A plurality of axially aligned rotary disk cutters each provided with a hub, a shaft slidably supporting the hubs, openings through the cutters adjacent the hubs, a pair of lazy tongs passing through the openings and pivotally connected to the hubs at points or articulation of the levers, and handles on the end hubs extending away from the cutters.

6. A plurality of axially aligned rotary disk cutters each provided with a hub, a shaft slidably supporting the hubs, openings through the cutters adjacent the hubs, a pair of lazy tongs passing through the openings and pivotally connected to the hubs at points of articulation of the levers, and means for locking one of the end hubs in sliding adjustment along the shaft.

7. A plurality of axially aligned rotary disk cutters each provided with a hub, a shaft slidably supporting the hubs openings through the cutters adjacent the hubs, and a pair of lazy tongs passing through the openings and pivotally connected to the hubs at points of articulation of the levers, the hub at one end of the plurality of cutters being fixed to the shaft and the other slidably adjustably therealong.

8. A plurality of axially aligned rotary disk cutters each provided with a hub, a shaft slidably supporting the hubs, openings through the cutters adjacent the hubs, a pair of lazy tongs passing through the openings and pivotally connected to the hubs at points of articulation of the levers, and means for preventing rotation of the hubs relative to the shaft.

9. A splined shaft, a series of splined hubs slidable thereon, a cutter disk secured to each hub, the two end hubs of the series being elongated and provided with revolvable handles beyond the disks, openings through the disks adjacent the hubs, a lazy tongs arrangement pasing through the openings pivotally connecting the hubs for simultaneous movement therewith along the shaft when operating the tongs by sliding one of the end hubs.

HENRY RICCI.